(12) United States Patent
Mueller et al.

(10) Patent No.: US 8,988,971 B2
(45) Date of Patent: Mar. 24, 2015

(54) ULTRASONIC TRANSDUCER FOR USE IN A FLUID MEDIUM

(75) Inventors: Roland Mueller, Steinheim (DE); Gerhard Hueftle, Aspach (DE); Michael Horstbrink, Stuttgart-Feuerbach (DE); Tobias Lang, Stuttgart (DE); Sami Radwan, Stuttgart (DE); Bernd Kuenzl, Schwieberdingen (DE); Roland Wanja, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 13/502,712

(22) PCT Filed: Sep. 10, 2010

(86) PCT No.: PCT/EP2010/063279
§ 371 (c)(1),
(2), (4) Date: Aug. 31, 2012

(87) PCT Pub. No.: WO2011/051041
PCT Pub. Date: May 5, 2011

(65) Prior Publication Data
US 2012/0320713 A1 Dec. 20, 2012

(30) Foreign Application Priority Data
Oct. 29, 2009 (DE) .......... 10 2009 046 147

(51) Int. Cl.
*G10K 11/00* (2006.01)
*G10K 9/122* (2006.01)
(Continued)

(52) U.S. Cl.
CPC .............. *G10K 9/122* (2013.01); *G01F 23/296* (2013.01); *G01F 23/2968* (2013.01); *G10K 9/22* (2013.01)
USPC .......................................................... 367/140

(58) Field of Classification Search
CPC ......... G01F 23/296; G01F 1/662; G10K 9/22; G10K 9/122; G10K 11/004; G10K 23/2968; B06B 1/0655; G01P 5/24; G01N 29/2437
USPC .......................... 367/140, 141; 310/337, 327
See application file for complete search history.

(56) References Cited

U.S. PATENT DOCUMENTS 4,705,981 A 11/1987 Inoue et al.
6,268,683 B1 7/2001 Li
(Continued)

FOREIGN PATENT DOCUMENTS

DE 2934031 10/1980
DE 100 55 893 5/2002
(Continued)

OTHER PUBLICATIONS

Translation of EP1315144.*
(Continued)

*Primary Examiner* — Daniel Pihulic
(74) *Attorney, Agent, or Firm* — Kenyon & Kenyon LLP

(57) ABSTRACT

An ultrasonic transducer for use in a fluid medium includes at least one housing having at least one inner space, at least one transducer core accommodated in the inner space, having at least one electroacoustic transducer element. The housing has at least one opening facing the fluid medium. The opening is covered at least partially by at least one sealing foil. An edge of the sealing foil is sealed by at least one sealing material.

12 Claims, 3 Drawing Sheets

(51) Int. Cl.
   *G01F 23/296*   (2006.01)
   *G10K 9/22*      (2006.01)

(56) References Cited

U.S. PATENT DOCUMENTS

| | | | |
|---|---|---|---|
| 8,596,139 B2 * | 12/2013 | Mueller et al. | 73/861.18 |
| 2008/0089538 A1 | 4/2008 | Ono | |
| 2011/0314933 A1 * | 12/2011 | Mueller et al. | 310/337 |
| 2012/0320713 A1 * | 12/2012 | Mueller et al. | 367/141 |
| 2013/0014592 A1 * | 1/2013 | Mueller et al. | 73/861.27 |

FOREIGN PATENT DOCUMENTS

| | | |
|---|---|---|
| DE | 10 2007 010 500 | 9/2008 |
| DE | 10 2007 037 088 | 2/2009 |
| DE | 10 2008 062 020 | 7/2009 |
| DE | 10 2008 055 126 | 7/2010 |
| EP | 1 315 144 | 5/2003 |
| JP | 9-65489 | 3/1997 |
| JP | 9-93698 | 4/1997 |
| JP | 2008-93222 | 4/2008 |
| JP | 2008-270869 | 11/2008 |
| JP | 2009-160965 | 7/2009 |
| JP | 2009142454 | 7/2009 |

OTHER PUBLICATIONS

International Search Report for PCT/EP2010/063279, dated Dec. 27, 2010.

* cited by examiner

ULTRASONIC TRANSDUCER FOR USE IN A FLUID MEDIUM

BACKGROUND OF THE INVENTION

1. Field of the Invention

The present invention relates to an ultrasonic transducer for use in a fluid medium.

2. Description of Related Art

Various types of ultrasonic transducers for use in fluid media are known from the related art. By ultrasonic transducer one generally means an element that is in a position to emit ultrasonic signals into the fluid medium and/or to pick up ultrasonic signals from the fluid medium and convert them to electrical signals, for example. Such ultrasonic transducers are used, for instance, in ultrasonic flowmeters in industrial process engineering and/or in the automotive field, for example, in flowmeters (ultrasonic flowmeters, UFM), particularly in the intake tract and/or the exhaust tract of internal combustion engines. Examples of such ultrasonic transducers are known from published German patent application documents DE 10 2007 010 500 A1, DE 10 2007 037 088 A1 or from German patent application DE 10 2008 055 126.0. The ultrasonic transducers described there may also basically be used within the scope of the present invention, and modified according to the present invention.

As a rule, ultrasonic transducers have at least one electroacoustic element, for instance, a piezoelectric transducer. However, in flow metering in air or other gases, the problem arises that a high acoustical impedance difference will be registered between the material of the electroacoustic transducer element and the air, which leads to high coupling losses in the coupling of ultrasonic signals between the electroacoustic transducer and the gas. The signal level swings may be correspondingly weak if, for example, from the transducer signals during flow metering, air measurement signals within the system control of an internal combustion engine are derived. Thus, ultrasonic transducers are familiar which have sound-radiating resonance members or matching members, such as a metallic diaphragm or a $\lambda/4$-impedance-matching layer. Such impedance-matching layers, which may basically be geometrically designed as desired, are known, for instance, from the abovementioned documents of the related art.

In known ultrasonic transducers, a housing is usually used, in which a transducer core is accommodated. On the side facing the fluid medium, this housing has an opening, inside which the radiation surface of the transducer core is situated, via which ultrasonic signals are emitted or picked up. In order to close the housing in a manner that is sealed to the medium and/or pressure tight, it is known from German patent application document DE 10 2008 055 126.0 that one may span this opening entirely or partially using a sealing foil. However, the technical challenge comes up in this context that, at the edges of the sealing foil, media continue to be able to penetrate into the inner space of the housing, which can make itself known disadvantageously during flow measurements in internal combustion engines, for example.

BRIEF SUMMARY OF THE INVENTION

For this reason, an ultrasonic transducer and a sensor system are provided for use in a fluid medium, which, at least to a great extent, avoid the disadvantages of known ultrasonic transducers and sensor systems. The fluid medium may particularly be a gas, such as air or an exhaust gas. The ultrasonic transducer and the sensor system may accordingly be used particularly ultrasonic flowmeters (UFM's), such as in motor vehicle internal combustion engines. Alternative application fields are sensors for gases or liquids, in industrial process engineering, for example, especially for process control, as distance sensors, as fluid-level sensors or as flow sensors, such as in the chemical or pharmaceutical industry. Other fields of use are medical technology, for instance, for breathing gas monitoring, or energy technology, as heat counter, for example.

The ultrasonic transducer provided includes at least one housing having at least one inner space. By housing one should understand, in this instance, an at least partially enclosed element which is able to define the outer shape of the ultrasonic transducer itself, and which is able to protect the ultrasonic transducer at least partially from mechanical stress. As will be presented in greater detail below, the housing may, for instance, be made wholly or partially of a plastic material, such as a thermoplastic material and/or of a metallic material.

By inner space, a plurality of these being possible, one should generally understand an at least partially enclosed space and a space that is at least partially within the housing. This inner space may, for instance, be designed to be approximately cylindrical, as will be explained below.

Furthermore, the ultrasonic transducer includes at least one transducer core accommodated in the inner space, having at least one electroacoustic transducer element. By an electroacoustic transducer element one should basically understand any element that is prepared to transform electrical signals to acoustical signals, especially to ultrasonic signals, or vice versa. This electroacoustic transducer element may include at least one piezoelectric transducer element, for example. Without restricting further possible designs of the electroacoustic transducer element, in the following, the term "piezo" or the term "piezoelectric transducer element" or the term "piezoceramic" will therefore also be used as synonyms for the electroacoustic transducer element. Alternatively or in addition, however, the electroacoustic transducer element may also include other elements of the function named.

Besides the at least one electroacoustic transducer element, the transducer core is able to include further elements. In particular, as will be stated in greater detail below, the transducer core is able to include at least one matching element which is equipped to improve an acoustic coupling between the electroacoustic transducer element and the fluid medium. In this context, it may be an impedance-matching element. In optimum fashion, this impedance-matching element has an acoustic impedance which is between the acoustic impedance of the electroacoustic transducer element and the acoustic impedance of the fluid medium, ideally close to the geometric mean of these acoustic impedances. In the case of real ultrasonic transducers and especially in the case of gaseous media, matching elements are also used having other, mostly higher acoustic impedances. The matching element may also include a plurality of materials having different acoustic impedances and/or a material having an acoustic impedance gradient. For possible embodiments of such a matching element, which may be embodied, for example, as a matching layer, we may point out the documents cited above, namely, published German patent application documents DE 10 2007 010 500 A1, DE 10 2007 037 088 A1 and DE 10 2008 055 126.0. The matching elements used in those documents may basically also be used within the scope of the present invention. Moreover, the transducer core may include additional elements. For example, between the optional matching element and the electroacoustic transducer element, at least one compensation element, particularly at least one compensation layer may be provided. Such a compensation element is able to prevent, for instance, the buildup of thermomechanical stresses based on different thermal coefficients of expansion of the electroacoustic transducer element and the matching element, for example, in that a thermal coefficient of expansion is selected for this compensation element which lies between that of the electroacoustic transducer element and that of the matching element. As an example, this compensation element may include at least one adhesive layer. However, other designs are basically also possible.

The transducer core is particularly able to have at least one radiation surface. By radiation surface, one will basically understand, in this instance, any surface via which acoustic signals are able to be emitted by the transducer core to the fluid medium, and/or via which acoustic signals from the fluid medium are able to be picked up by the transducer core. This at least one radiation surface may face the fluid medium and may be situated within an opening of the housing, for example. Thus, the housing may have an opening facing the fluid medium, for example, for instance, an opening which is enclosed completely or partially by the edge of the housing. The radiation surface may be situated within this opening, the latter being preferably situated in the same plane as the edge of the housing. Another embodiment is also possible, such as a situation not in the same plane as the edge of the housing.

The at least one opening of the housing, which may be designed to be circular or polygonal, for example, is at least partially covered, preferably completely covered by at least one sealing foil. By sealing foil one should basically understand, in this instance, any foil-like element which is equipped to keep effects of the fluid medium, such as pressure effects and/or chemical effects at least partially from the inner space. By foil-like element one should understand, in this context, an element whose lateral extension exceeds its thickness by at least a factor of 10, preferably by at least a factor of 100 or at least a factor of at least 1000. The sealing foil may include plastic foil and/or a metallic foil and/or a ceramic foil, for example. The sealing foil may include, for instance, a thermoplastic material or a duroplastic material. Possible materials that may be used individually or in combination are polyetheretherketone (PEEK), polyphenylenesulfide (PPS), polyimide (particularly Kapton®), a liquid crystal polymer (LCP), fluorocarbons such as teflon or polytetra fluoroethene (PTFE) or, for instance, perfluoroethylenepropylene copolymer (FEP), polyethylenenaphtalate (PEN or other plastics. Combinations of the materials named and/or other materials may also be used. Alternatively or in addition, a thin metal foil may also be used. Furthermore, composite materials may also be used, such as materials having several foil layers, or the like. Moreover, at least one such foil layer may be provided as a coating, made up, for instance, of a metallic, ceramic or plastic material. The sealing foil may also include an adhesive layer by the use of which, particularly independently of sealing material, a force-locking or continuous material connection to the housing is achieved.

This being the case, the ultrasonic transducer according to the present invention may be designed, for instance, analogously to the ultrasonic transducer described in post-published German patent application DE 10 2008 055 126.0. By contrast to the ultrasonic transducer shown there, and for the design approach of the sealing problem shown above, it is provided according to the present invention, however, that one should seal one edge of the sealing foil by at least one sealing material. By one edge of the sealing foil one may understand, in this instance, a border of the sealing foil, that is, a border of the lateral extension of the sealing foil. However, the edge may also be covered beyond this border by the at least one sealing material.

By a sealing material one should understand, in this context, basically any material which is able to be applied to the sealing foil in a deformable state, for instance, in a liquid, viscous or pasty or otherwise deformable state. The sealing foil is thus able to adapt itself to the shape of the edge of the foil. The sealing material is also able particularly to penetrate wholly or partially into an interstice between the housing and the edge of the sealing foil, and/or is able to close a gap between an edge of the sealing foil and the housing. By sealing, one should generally understand, in this context, a state in which the inner space is protected by the sealing material at least partially from influences of the fluid medium, such as from chemical effects and/or pressure effects.

The sealing material may particularly include at least one adhesive. The sealing material may particularly include an epoxide and/or a hot thixotropic adhesive. The sealing material may, for instance, be designed to be caterpillar-like, particularly as an adhesive bead. Thus, the sealing material is able to be applied to the edge of the sealing foil in an encircling manner, or at least partially in an encircling manner.

The housing may especially have a housing edge facing the fluid medium, at least partially encircling the opening. Then the sealing foil is able to lie on the housing edge at least partially, preferably in a manner so that the edge of the sealing foil also lies on the housing edge. By lying on, one may understand, in this instance, a direct, or even an indirect lying on, the latter being applied via at least one additional adhesive layer and/or at least one adhesive coating, which may be applied between the sealing foil and the housing edge and which is able to produce a connection between the sealing foil and the housing edge.

The sealing foil may be connected to the housing edge by continuous material and/or by force locking or form locking. In addition, as described above, the edge of the sealing foil is sealed by the at least one sealing material, a gap and/or an interstice being preferably sealed between the sealing foil and the housing edge.

The housing edge may include a flat rim or one that is bent over, for example. The sealing foil may follow the course of the housing edge, in this instance, and be designed to be flat or bent over, for example. The edge of the sealing foil may, for instance, close essentially in common with the housing edge, so that the edge of the sealing foil at least does not protrude substantially, i.e. particularly by less than 1 mm, laterally beyond the housing edge. In this case, for instance, the at least one sealing material may be applied to the edge of the sealing foil and the housing edge of the housing, or rather its edge at the same time.

The housing may be designed as one part or several parts. If the housing is designed as several parts, it may include, for instance, at least a first housing part and at least a second housing part, the sealing material being able also to produce a continuous material connection between the first housing part and the second housing part. In addition, the first housing part and the second housing part may optionally be connected to each other by at least one further connection, which may basically be of a continuous material and/or a force-locking and/or a form-locking nature. In this context, ultrasonic welding or latching between the first housing part and the second housing part are particularly preferred.

Besides the ultrasonic transducer in one or more of the abovementioned embodiments, a sensor system is furthermore provided. This sensor system may particularly be equipped to detect at least one property of the fluid medium, for instance a fluid level and/or a volume flow and/or a mass flow of the fluid medium. Other embodiments are also possible. The sensor system includes at least one ultrasonic transducer according to one or more of the abovementioned embodiments. A sensor system may include, for instance, two or more ultrasonic transducers, in order to draw a conclusion, for example, on the flow of a fluid medium, via a running time measurement. Such sensor devices are basically known from the related art. Furthermore, the sensor system includes at least one sensor housing, the ultrasonic transducer being connected to the sensor housing.

In order to produce a connection between the ultrasonic transducer and the sensor housing, one may, in turn, use a force-locking and/or form-locking and/or a continuous material connection, for example. The ultrasonic transducer may be adhered with its housing into the sensor housing, for example, or be adhered onto it. In this context, it is particularly preferred if the sealing material of the ultrasonic transducer is used in a double function and, at the same time, effects a continuous material connection between the ultrasonic transducer and the housing element of the sensor system. In the case of the sensor system described, the sealing material may particularly be disposed in such a way that it does not protrude or it protrudes in only a reduced measure beyond the sensor device, for instance, beyond a housing edge facing the fluid medium. In particular, the sensor housing and/or the housing of the ultrasonic transducer may be designed so that the sealing material is taken up in at least one depression. This depression may be situated wholly or partially in the sensor housing and/or wholly or partially in the housing and/or between the housing and the sensor housing. This depression may include a groove, particularly an encircling groove, for example. In this encircling groove the sealing material may be accommodated. Accordingly, for instance, the edge of the sealing foil may be bent into the at least one depression, in order to be sealed in there by the at least one sealing material.

The sensor housing may especially have at least one accommodation. The housing of the ultrasonic transducer may be take up at least partially in this accommodation. The accommodation may include a cylindrical form in the sensor housing, for example, particularly a cylindrical depression. The housing may be taken up in the accommodation in such a way that in response to the pressure stress of the sensor system by the fluid medium, there is essentially no tensile stress on the sealing foil and/or the sealing material. This may be managed, for instance, in such a way that, as described above, the sealing material and/or the edge of the sealing foil are taken up at least partially in the at least one depression, for instance, in an encircling groove. Thus, a rim of the housing may be provided, for example, with the edge of the sealing foil and/or the sealing material being situated on or at the rim, the rim lying against the sensor housing, for instance, in a depression of the sensor housing. In the case of a counter-pressure stress by the fluid medium, the rim is then pressed against the sensor housing, so that no tensile stress, or only a very slight tensile stress, occurs of the edge of the sealing foil and/or of the sealing material, for instance, of the adhesion. One may, however, put up with slight tensile stresses, in this instance. Thus, viewed purely physically, the sealing foil, for instance, may always be tensile-stressed in response to pressure stress of the sensor system, if, for example, the inside of the ultrasonic transducer yields slightly and/or does not have an infinitely high modulus of elasticity, especially if the sealing foil lies in a taut manner or at least completely straightened out. However, such stresses may be tolerated in a certain respect and are still tolerable with respect to the concept "essentially no tensile stress".

The ultrasonic transducer provided and the sensor system provided have numerous advantages over the known ultrasonic transducers and sensor systems. In particular, an ultrasonic transducer impervious to media may be provided in this way which, in particular, may also be used for flow measuring in internal combustion engines and/or in other aggressive environments. Without the sealing foil named and/or the sealing, the inner space of the ultrasonic transducer, for instance, damping or structure-borne noise decoupling in the ultrasonic transducer, would be exposed to the, at times, aggressive fluid media, for instance, the media contained in a motor vehicle intake tract, such as moisture, oil, exhaust gas components, hydrocarbons, acids and similar aggressive media. For the decoupling of the transducer core from the housing, as a rule, soft silicones are required however, which have low resistance to these media.

However, a sealing foil by itself is usually exposed to relatively high stresses, especially because of pressure and/or temperature fluctuations. These stresses may be particularly attributed to thermal expansions of materials in the ultrasonic transducer, such as plastic materials. Accordingly, in the usual constructions, the sealing foil is easily infiltrated by media at its edges. On the other hand, by sealing the edges of the foil, the ultrasonic transducer is mechanically stabilized and with respect to its tightness.

Furthermore, producing the ultrasonic transducer named is also easily managed. The at least one sealing element may be used simultaneously for fastening the ultrasonic transducer in the sensor housing and/or for sealing the ultrasonic transducer from the sensor housing. The simultaneous production of the sealing and the fastening and/or seal considerably simplifies the process sequence during manufacturing.

DETAILED DESCRIPTION OF THE INVENTION

Figure 1:
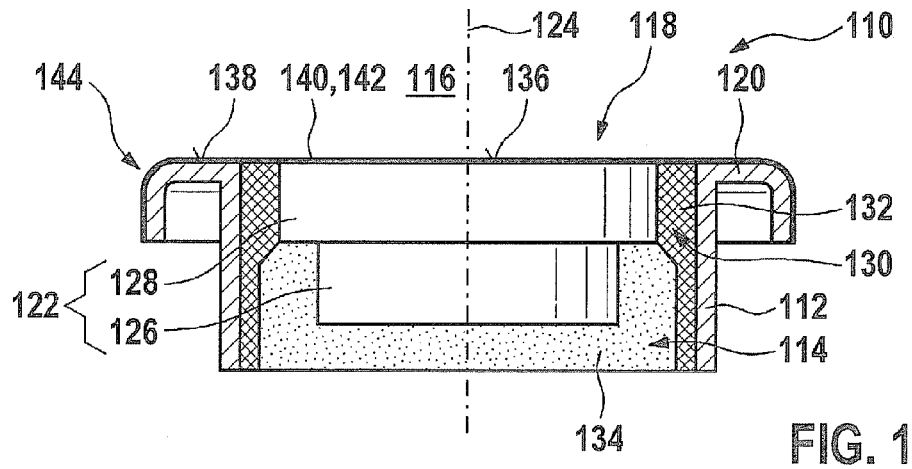
FIG. 1 shows an exemplary embodiment of a usual ultrasonic transducer.

FIG. 1 shows an exemplary embodiment of an ultrasonic transducer 110 corresponding to the related art, in a sectional representation. Ultrasonic transducer 110 may, for instance, essentially correspond to the ultrasonic transducer shown in German patent application document DE 10 2008 055 126.0. However, other designs are also possible. Ultrasonic transducer 110 includes a housing 112, which is shown only partially in the exemplary embodiment shown. This housing 112 is designed to be sleeve-shaped and has an inner space 114. This inner space 114 in turn has on its side facing fluid medium 116 an opening 118, which may have a circular or polygonal cross section. This opening 118 is surrounded by a housing edge 120 in a circular manner, which in the exemplary embodiment shown is bent over backwards, away from fluid medium 116.

Within inner space 114, in the exemplary embodiment shown, a transducer core 122 is accommodated, for instance, concentrically to an axis 124 of ultrasonic transducer 110. Transducer core 122 includes an electroacoustic transducer element 126, for instance, a piezoelectric transducer element. Furthermore, transducer core 122 includes a matching element 128 on its side facing fluid medium 116, which, as shown above, is used for the improvement of the acoustical coupling between transducer core 122 and/or electroacoustic transducer element 126 and fluid medium 116. For possible embodiments of matching element 128, which may be designed, for instance, as a λ/4-impedance matching layer, we refer to published German patent application documents DE 10 2007 037 088 A1, DE 10 2007 010 500 A1 or DE 10 2008 055 126.0. Other embodiments are also possible. Between optional matching element 128 and electroacoustic transducer element 126, further elements may be accommodated, such as a compensating layer for matching the thermal coefficients of expansion. Moreover, transducer core 122 may include additional elements.

Between transducer core 122 and housing 112, an interstice 130 may be provided. As shown in FIG. 1, this interstice 130 may be entirely or partially filled up with a decoupling element 132. This decoupling element 132 is used for the damping of structure-borne noise transmissions between housing 112 and transducer core 122, which could lead, for example, to parasitic ultrasound paths between a plurality of ultrasonic transducers 110 in a sensor system. Examples of such decoupling elements 132 are decoupling using a silicone material. The decoupling element 132 may be designed, for instance, as a molded part or also entirely or partially as a molded-around part. Furthermore, a damping material 134 may optionally be provided at the rear of transducer core 122, in the exemplary embodiment shown. This damping material 134 may be inserted on the rear side of housing 112 as a damping molding compound, and is used to speed up the decay response of transducer core 122.

On the side facing fluid medium 116, transducer core 122 has a radiation surface 136, that is, a surface via which ultrasonic signals are able to be emitted to fluid medium 116 and/or ultrasonic signals are able to be picked up from fluid medium 116. This radiation surface 136 is situated in the exemplary embodiment in a plane having an end face 138 of housing edge 120. Decoupling element 132 also preferably closes off in this plane. The whole side of ultrasonic transducer 110 facing fluid medium 116 in the example shown, in this instance, is spanned by a sealing element 140 in the form of a sealing foil 142. Sealing foil 142 may, for instance, be adhered to radiation surface 136 and/or housing edge 120, for example.

Ultrasonic transducer 110 according to FIG. 1 is a fictitious ultrasonic transducer, which one may assume for the present invention, but which in this fashion is not yet usual in the market or known and publicized in another way. However, ultrasonic transducer 110 according to FIG. 1 may be modified in various ways, as is stated in greater detail below. Thus, ultrasonic transducer 110 according to FIG. 1 may be modified in many respects. For instance, matching element 128 may be designed in various ways, and may particularly include an impedance-matching layer having a material provided with hollow bodies, such as a porous ceramic, a foamed plastic material, especially a duroplastic or a thermoplastic or generally a polymer, or generally a plastic material provided with hollow bodies. Plastic hollow bodies or glass hollow bodies, preferably glass hollow spheres, are suitable as hollow bodies, in this instance. If a plastic is used as the base material, an epoxy material filled with glass hollow spheres may be used, for example.

Alternatively, a polyimide would be available, such as a foamed and/or a sintered or porous polyimide, such as Kapton® or the material Vespel® of the firm of DuPont. Matching element 128 may include additional materials or regions which make possible, for instance, impedance matching in several steps of electroacoustic transducer element 126, for instance, from the piezo to fluid medium 116, such as air, or which, with respect to their thermal expansion behavior, their flexibility or their capability of removing stresses, are used for protecting the overall composite of transducer core 122 and particularly the electroacoustic transducer element from strains.

Alternatively, transducer core 122 or a coupling assembly of this transducer core 122 could also include a different type of sound-radiating resonance element or matching element, such as a metal diaphragm or a metal element having a metal diaphragm. In this case, impedance matching may take place, for example via a conversion of a radial motion or a bending motion of small amplitude but large force, for instance, of a piezo element into an oscillation motion having small force but large amplitude, as is required for coupling into air or other gases. Transducer core 122, that is, for example, a piezoceramic and a coupling assembly, are fastened via decoupling element 132 in housing 112. Decoupling element 132 may preferably be embodied as a silicone type. It may also include a material filled up with particles or hollow spaces, such as also of silicone material. Housing 112 itself may be made, for instance, of a plastic material and/or a metallic material. In the direction towards fluid medium 116, sealing foil 142 closes ultrasonic transducer 110. As was stated above, a large number of materials come into consideration for this sealing foil 142, such as PEEK, PPS, polyimide (such as Kapton®), LCP, PTFE, FEP, PEN or other plastics or thin metal foils having metallic, ceramic or plastic type coatings, foils having an adhesive layer or even combinations of the materials named and/or others. Sealing foil 142 preferably has a thickness of less than 100 μm, and a thickness of less than 25 μm is particularly advantageous.

As was mentioned above, the front sleeve region is embodied in the exemplary embodiment shown, for example, as a "rim" 144, and is bent over backwards. This embodiment has the advantage that housing edge 120 lies against the sensor housing when there is a counterpressure stress (not shown in FIG. 1), so that in this case there does not occur any tensile stress of an adhesion applied there. The rim geometry of housing 112 and the geometry of the sensor housing may in addition be formed so that a groove and a spring come about for an adhesion. In the case of the use of a hot thixotropic adhesive this is not absolutely necessary. An epoxy material may be used, for example, as the adhesive.

Figure 2A:
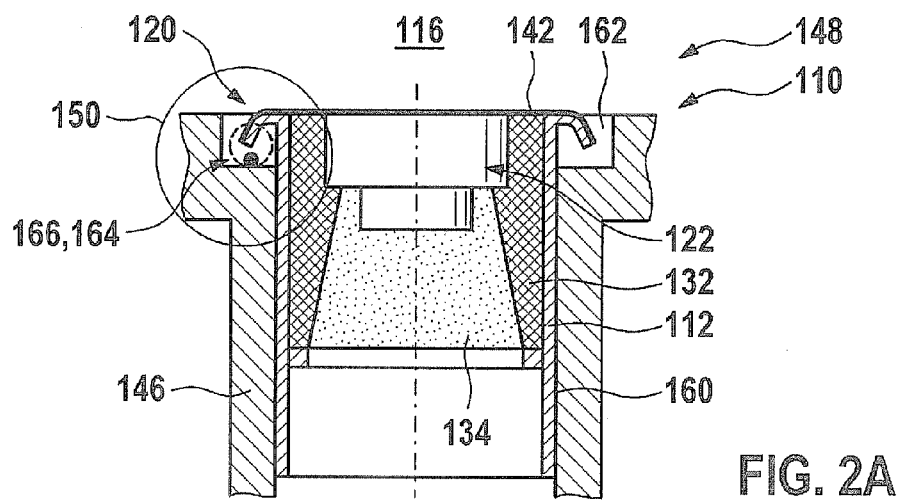
FIGS. 2A and 2B show an exemplary embodiment of an ultrasonic transducer according to the present invention and a sensor system according to the present invention
Figure 2B:
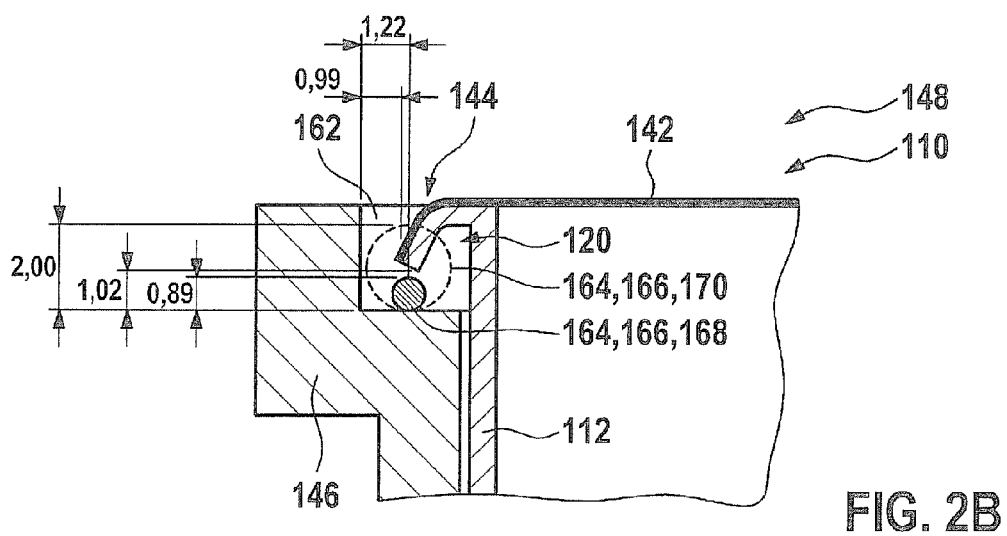

Ultrasonic transducer 110 shown in FIG. 1 forms the starting point for the present invention. Accordingly, the above-mentioned features of ultrasonic transducer 110 according to FIG. 1 may also optionally be present in an ultrasonic transducer 110 according to the present invention. FIGS. 2A and 2B show a modification according to the present invention of ultrasonic transducer 110 of FIG. 1. At the same time, ultrasonic transducer 110 shown there is accommodated in a sensor housing 146 of a sensor system 148, so that the representations show at the same time exemplary embodiments of a sensor system 148 according to the present invention. A sensor system 148 may include a plurality of ultrasonic transducers 110, for instance, a plurality of ultrasonic transducers 110 that are used for a running time measurement in fluid medium 116. In this context, FIG. 2A shows a schematic overall view of ultrasonic transducer 110, whereas FIG. 2B shows only an enlarged representation of a transitional region, designated in FIG. 2A by reference numeral 150, between ultrasonic transducer 110 and sensor housing 146. As may be seen in FIG. 2A, ultrasonic transducer 110 is accommodated, in the exemplary embodiment shown, in an accommodation 160 in sensor housing 146. This accommodation 160 may include, for instance, a cylindrical depression. Accommodation 160 may be designed, for instance, in such a way that ultrasonic transducer 110 on the side of fluid medium 116 closes flush with sensor housing 146. However, other designs are also possible. In the region of housing edge 120 of ultrasonic transducer 110, accommodation 160 and sensor housing 146 preferably have a depression 162. Rim 144 of housing edge 120 is preferably accommodated in this depression 162. Sealing foil 142 may, for instance, close flush with housing edge 120 of housing 112.

As may be seen particularly in the enlarged representation in FIG. 2B, in the embodiment according to the present invention, an edge of sealing foil 142 is sealed using a sealing material 164. This sealing material 164 may include an adhesive, for example. In the exemplary embodiment shown, sealing material 164 is designed in the form of an adhesive bead, for example. Two possible diameters of adhesive beads 166 are shown, in this context, by reference numeral 168 an adhesive bead having a first, smaller diameter being designated, and by reference numeral 170 an adhesive bead having a second, larger diameter being designated. Adhesive bead 170 is shown here by a dashed line, whereas adhesive bead 168 is shown by solid lines. These diameters may be used alternatively. For example, adhesive bead 168 may have a diameter of 0.89 mm, whereas adhesive bead 170 may have a diameter of 2 mm, and may, for example, cover up housing edge 120 of housing 112 in a further region. All the dimensional statements in FIG. 2 should be taken as being exemplary, and they are given in millimeters. Adhesive bead 166 is preferably dimensioned so that it is accommodated completely in optional depression 162 of sensor housing 146.

Thus, in FIGS. 2A and 2B, possible special geometric formations are shown in exemplary fashion using two different possible adhesive bead diameters. If the insertion of ultrasonic transducer 110 is to take place in a manner different from the embodiments shown, for instance, in an inverted construction "overhead", then, as the adhesive for adhesive bead 166, it is preferable to use a hot thixotropic adhesive, which keeps its shape over the temperature, i.e. during hardening. Rim 144 of housing edge 120 dips, in common with the edge of sealing foil 142, preferably completely into the adhesive bed of adhesive bead 166. Sealing foil 142 may, for instance, be deep-drawn by a deep-drawing process during the production of the transducer, around the contour of rim 144. The quantity of adhesive and the positioning of the adhesive should be measured during the application of adhesive bead 166, for instance, using a dispenser process, in such a way that, on the one hand, the end of the foil is completely enclosed by adhesive and, on the other hand, preferably at the same time, housing 112 is permanently sealed from sensor housing 146.

Figure 3:
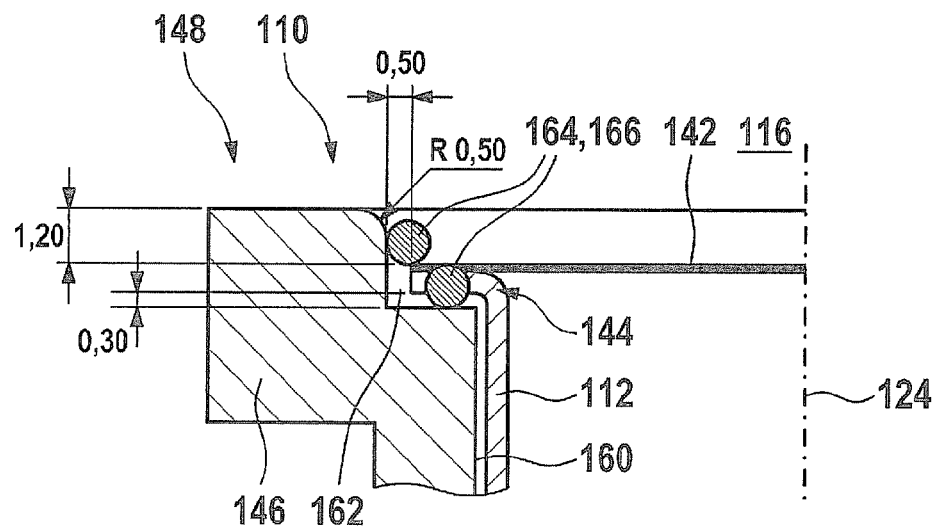
FIGS. 3 and 4 show modified exemplary embodiments of an ultrasonic transducer according to the present invention and of a sensor system according to the present invention.

In an analogous representation to FIG. 2B, FIG. 3 shows a modification of the exemplary embodiment according to FIGS. 2A and 2B. A sensor housing 146 is shown again, having a depression 162, in which the ultrasonic transducer 110 is inserted with its housing 112. This exemplary embodiment shows that ultrasonic transducer 110, on the side of fluid medium 116, does not necessarily have to close flush with sensor housing 146, but may also, for instance, be moved into sensor housing 146 and accommodated recessed in accommodation 160

FIG. 3 also shows that rim 144 does not necessarily have to be bent over backwards, but may also be designed to be flat, for example.

By contrast to the embodiment in FIGS. 2A and 2B, in the exemplary embodiment according to FIG. 3, two adhesive beads 166 are provided. One of these adhesive beads 166 may rather take on the task of sealing the edge of sealing foil 142, whereas the other of these adhesive beads 166 is able to connect ultrasonic transducer 110 to sensor housing 146 and/ or effect the sealing between housing 112 and sensor housing 146. This exemplary embodiment shows that the tasks named may also optionally be taken on by several elements, for example by several adhesive beads. Adhesive beads 166 may in turn, for example, have a diameter of 0.89 mm. All the specifications in FIG. 3 are again in millimeters.

Figure 4:
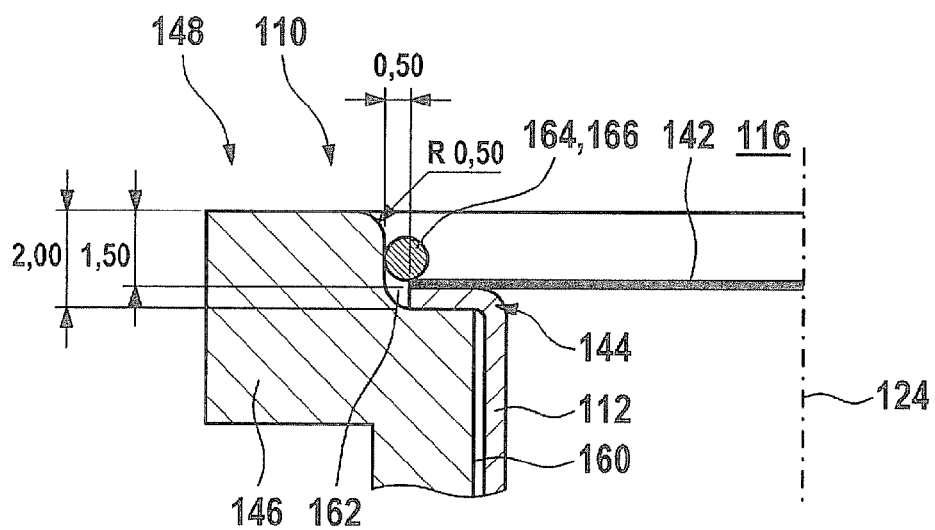

In FIG. 4, on the other hand, a modification is shown of sensor system 148 according to FIG. 3, in which only a single adhesive bead 166 is provided. In the exemplary embodiment shown, this single adhesive bead 166 takes on the function of sealing the edge of sealing foil 142. Furthermore, it takes on the function of adhering sensor housing 112 in accommodation 160 and/or sealing housing 112 from sensor housing 146 in a multifunctioning manner. In this context, in contrast to FIG. 3, depression 162 in sensor housing 146 may also be designed to be rounded off. Adhesive bead 166 may again, for example, have a diameter of 0.89 mm. But we should point out in general that in this, and also in other exemplary embodiments, the geometries of adhesive beads 166 and/or their positions may be greatly dependent on the special adhesive properties, so that even considerable deviations from the dimensions named are possible.

Figure 5:
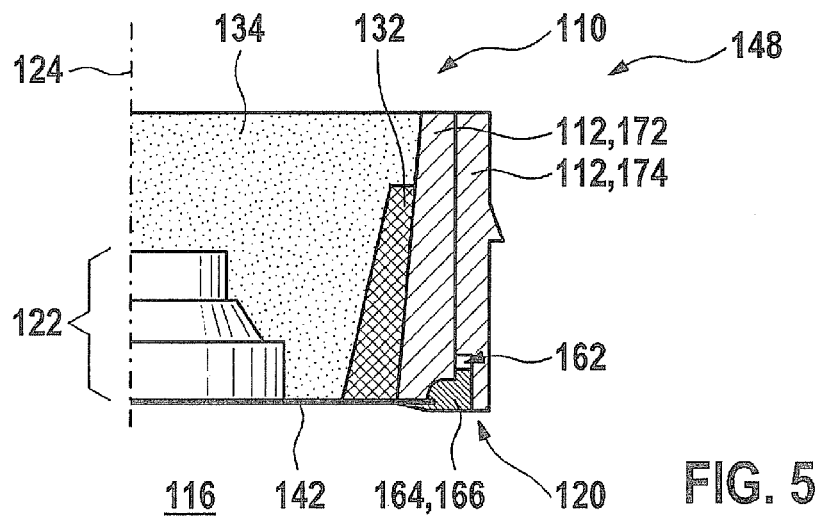
FIGS. 5 to 7 show various exemplary embodiments of ultrasonic transducers having a multi-part housing.
Figure 6:
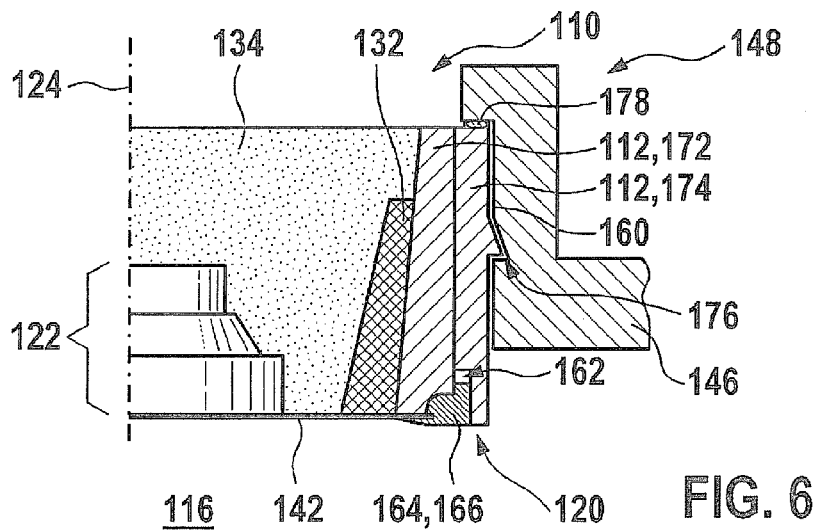

In the exemplary embodiments up to now it was shown that housing 112 is able to be developed essentially as one part. In FIGS. 5 and 6, by contrast, exemplary embodiments of an ultrasonic transducer 110 according to the present invention are shown in which housing 112 is able to be developed in several parts. In turn, ultrasonic transducers 110 shown may also be components of a sensor system 148.

Thus, FIGS. 5 and 6 show exemplary embodiments, in which housing 112 includes a first housing part 172 and a second housing part 174. Housing 112 may be developed as a double transducer sleeve, for example. In a region facing fluid medium 116, in which sealing foil 142 is connected to housing 112, optionally again a depression 162 may be provided, which may be developed in first housing part 172 and/or second housing part 174, for example. In this depression 162, sealing material 164 may be accommodated wholly or partially. Sealing material 164 may be embodied again as an adhesive, such as an adhesive bead 166, for example. Accordingly, sealing material 164, in the exemplary embodiment shown, is used again in multi-functioning mode. Thus, it not only seals the edge of sealing foil 142, but it also seals between the walls of housing parts 172 and 174.

While in FIG. 5 a simple double-walled sleeve is provided as housing 112, FIG. 6, in turn, shows the possibility of further mounting ultrasonic transducer 110, for instance, in a sensor housing 146 of sensor system 148. For this purpose, in FIG. 6, a latching 176 of housing 112 may be provided in an accommodation 160 of sensor housing 146. This latching 176 may be used as a pre-fixing, which may be complemented by an additional sealing adhesion 178. The latter may then, with respect to its function, be decoupled from the foil seal by sealing material 164.

Figure 7:
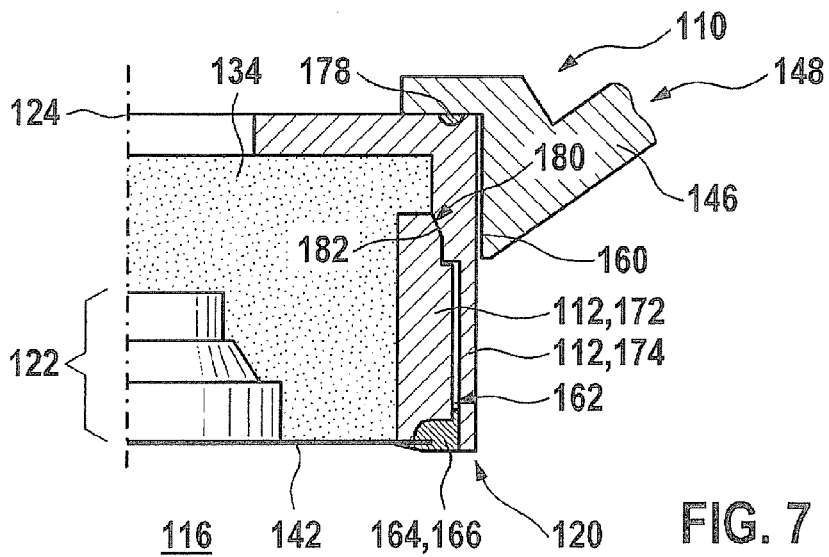

FIG. 7 shows an exemplary embodiment, that is modified with respect to FIG. 6, of ultrasonic transducer 110 and sensor system 148. A decoupling element 132 is not shown in FIG. 7 in this instance, but it may optionally be provided in addition. Here too, again two housing parts 172, 174 of housing 112 are provided, which are connected to each other by sealing material 164. In this context, it is shown, however, that in a multi-part housing 112 as well, the connection between housing parts 172, 174 is able to be managed wholly or partially by other connections. Thus, alternatively or in addition, to sealing material 164, one or more other connections may be provided, for example. The two housing parts 172, 174 may be connected to each other with force locking and/or with form locking and/or by continuous material, for example. In FIG. 7, in exemplary fashion, an ultrasonic welding 180 is provided, for instance, at an appropriate shoulder 182 and/or at another appropriate contour making possible such a connection. For additional possible details, we refer to the above description.

What is claimed is:

1. An ultrasonic transducer for use in a fluid medium, comprising:
   at least one transducer housing having at least one inner space and at least one opening facing the fluid medium;
   at least one transducer core accommodated in the inner space of the housing and having at least one electroacoustic transducer element;
   at least one sealing foil at least partially covering the opening of the housing facing the fluid medium; and
   least one sealing material sealing an edge of the sealing foil, wherein:
      the sealing material includes an adhesive,
      the housing has a housing edge facing the fluid medium and extending
   at least partially around the opening of the housing,
      the sealing foil lies at least partially on the housing edge, and
      the edge of the sealing foil closes essentially in common with the housing edge of the housing.

2. The ultrasonic transducer as recited in claim 1, wherein the sealing material includes at least one of an epoxide and a hot thixotropic adhesive.

3. The ultrasonic transducer as recited in claim 1, wherein the sealing material is configured to be at least partially of a caterpillar shape.

4. The ultrasonic transducer as recited in claim 1, wherein the housing edge has one of a flat rim or a bent-over rim.

5. The ultrasonic transducer as recited in claim 1, wherein the housing includes at least one first housing part and at least one second housing part, and wherein the sealing material produces a continuous material connection between the first housing part and the second housing part at the same time.

6. The ultrasonic transducer as recited in claim 5, wherein the first housing part and the second housing part are connected to each other by at least one additional connection including at least one of an ultrasonic welding and a latching.

7. A sensor system, comprising:
   at least one ultrasonic transducer for use in a fluid medium, wherein the at least one ultrasonic transducer includes:
      at least one transducer housing having at least one inner space and at least one opening facing the fluid medium;
      at least one transducer core accommodated in the inner space of the housing and having at least one electroacoustic transducer element;
      at least one sealing foil at least partially covering the opening of the housing facing the fluid medium;
   at least one sealing material sealing an edge of the sealing foil; and
   at least one sensor housing wherein:
      the ultrasonic transducer is connected to the sensor housing,
      the sealing material includes an adhesive,
      the transducer housing has a housing edge facing the fluid medium and extending at least partially around the opening of the transducer housing,
      the sealing foil lies at least partially on the housing edge, and
      the edge of the sealing foil closes essentially in common with the housing edge of the transducer housing.

8. The sensor system as recited in claim 7, wherein the sealing material produces a continuous material connection between the ultrasonic transducer and the sensor housing at the same time.

9. The sensor system as recited in claim 8, wherein at least one of the sensor housing and the transducer housing is configured so that the sealing material is accommodated in at least one depression.

10. The sensor system as recited in claim 8, wherein: the sensor housing has at least one accommodation; and the transducer housing is at least partially accommodated in the accommodation of the sensor housing in such a way that, in response to a pressure stress of the sensor system by the fluid medium, essentially no tensile stress is applied to at least one of the sealing foil and the sealing material.

11. The ultrasonic transducer as recited in claim 1, further comprising a decoupling element disposed in an interstice between the transducer core and the housing.

12. The sensor system as recited in claim 7, further comprising a decoupling element disposed in an interstice between the transducer core and the transducer housing.

* * * * *